(12) United States Patent
Schuhmacher et al.

(10) Patent No.: US 11,342,582 B2
(45) Date of Patent: May 24, 2022

(54) LITHIUM-ION-CONDUCTING COMPOSITE MATERIAL, COMPRISING AT LEAST ONE POLYMER AND LITHIUM-ION-CONDUCTING PARTICLES

(71) Applicant: SCHOTT AG, Mainz (DE)

(72) Inventors: Joerg Schuhmacher, Kornwestheim (DE); Jochen Drewke, Mainz (DE); Hans-Joachim Schmitt, Ockenheim (DE); Philipp Treis, Mainz (DE); Miriam Kunze, Neustadt am Rübenberge (DE); Andreas Roters, Mainz (DE); Meike Schneider, Taunusstein (DE)

(73) Assignee: SCHOTT AG, Mainz (DE)

(*) Notice: Subject to any disclaimer, the term of this patent is extended or adjusted under 35 U.S.C. 154(b) by 0 days.

(21) Appl. No.: 16/193,128

(22) Filed: Nov. 16, 2018

(65) Prior Publication Data
US 2019/0088998 A1    Mar. 21, 2019

Related U.S. Application Data

(63) Continuation of application No. PCT/EP2017/061626, filed on May 15, 2017.

(30) Foreign Application Priority Data

May 18, 2016 (DE) .......................... 102016208532.8

(51) Int. Cl.
| | |
|---|---|
| *H01M 10/0565* | (2010.01) |
| *H01M 10/052* | (2010.01) |
| *H01M 2/16* | (2006.01) |
| *C08J 5/22* | (2006.01) |
| *H01M 10/056* | (2010.01) |
| *H01M 50/403* | (2021.01) |
| *H01M 50/409* | (2021.01) |
| H01M 4/36 | (2006.01) |

(52) U.S. Cl.
CPC .......... *H01M 10/0565* (2013.01); *C08J 5/22* (2013.01); *H01M 10/052* (2013.01); *H01M 10/056* (2013.01); *H01M 50/403* (2021.01); *H01M 50/409* (2021.01); *H01M 4/366* (2013.01); *H01M 2220/20* (2013.01); *H01M 2300/0065* (2013.01); *H01M 2300/0082* (2013.01); *H01M 2300/0091* (2013.01); *Y02E 60/10* (2013.01); *Y02P 70/50* (2015.11)

(58) Field of Classification Search
CPC .......... H01M 10/0565; H01M 10/056; H01M 2/145; H01M 2/16; H01M 10/052; H01M 2220/20; H01M 2300/0065; H01M 2300/0082; H01M 4/366; H01M 2300/0091; H01M 4/62; C08J 5/22; Y02E 60/122; Y02P 70/54
See application file for complete search history.

(56) References Cited

U.S. PATENT DOCUMENTS

| | | | |
|---|---|---|---|
| 2009/0081554 A1* | 3/2009 | Takada ................. | H01M 10/052 429/322 |
| 2015/0171463 A1* | 6/2015 | Liang ................. | H01M 10/0562 429/322 |
| 2015/0255767 A1* | 9/2015 | Aetukuri .................... | C08J 5/22 429/249 |
| 2015/0280197 A1 | 10/2015 | Zhao | |
| 2016/0226097 A1* | 8/2016 | Wegner ............. | H01M 10/0565 |
| 2016/0293946 A1* | 10/2016 | Ritter .................... | H01M 4/485 |
| 2016/0351909 A1* | 12/2016 | Bittner ................. | H01M 4/366 |

FOREIGN PATENT DOCUMENTS

| | | |
|---|---|---|
| CN | 102044702 | 5/2011 |
| CN | 102529247 | 7/2012 |
| CN | 104377385 | 2/2015 |
| DE | 102012022606 | 5/2014 |
| DE | 102014206040 | 10/2015 |
| JP | 2006-252878 | 9/2006 |
| JP | 2016-504711 | 2/2016 |
| WO | 2015/043889 | 4/2015 |
| WO | 2015043917 | 4/2015 |

OTHER PUBLICATIONS

English translation of International Search Report dated Jul. 18, 2017 for corresponding PCT/EP2017/061626.
Croce, "Nanocomposite polymer electrolytes for lithium batteries", Nature Jul. 1998, 4pages.
Li, "All solid lithium polymer batteries with a novel composite polymer electrolyte", Solid State Ionics 159 (2003) pp. 97-109.
Stephan, "Review on composite polymer electrolytes for lithium batteries", Polymer 47 (2006) pp. 5952-5964.
Choi, "Enhancement of ionic conductivity of composite membranes for all-solid-state lithium rechargeable batteries incorporating tetragonal $Li_7La_3Zr_2O_{12}$ into a polyethylene oxide matrix", Journal of Power Sources 274 (2015) pp. 458-463.
Sakuda, "Modification of Interface Between $LiCoO_2$ Electrode and $Li_2S$—$P_2S_5$ Solid Electrolyte Using $Li_2O$—$SiO_2$ Glassy Layers", Journal of The Electrochemical Society 156 (1) (2009) pp. A27-A32.
Shimonishi, "Synthesis of garnet-type $Li_{7-x}La_3Zr_2O_{12-1/2x}$ and its stability in aqueous solutions", Solid State Ionics 183 (2011) pp. 48-53.

(Continued)

*Primary Examiner* — Muhammad S Siddiquee
(74) *Attorney, Agent, or Firm* — Ohlandt, Greeley, Ruggiero & Perle, L.L.P.

(57) ABSTRACT

A lithium-ion-conducting composite material is provided that includes at least one polymer and lithium-ion-conducting particles. The interfacial resistance for the lithium-ion conductivity between the polymer and the particles is reduced as a result of a surface modification of the particles and therefore the lithium-ion conductivity is greater than for a comparable composite material wherein the interfacial resistance between the polymer and the particles is not reduced.

24 Claims, 2 Drawing Sheets

(56) References Cited

OTHER PUBLICATIONS

Yang, "Improving the Performance of Lithium-Sulfur Batteries by Conductive Polymer Coating", ACSNANO vol. 5, No. 11, (2011), pp. 9187-9193.
Ju, "Improvement of the Cycling Performance of $LiNi_{0.6}CO_{0.2}Mn_{0.2}O_2$ Cathode Active Materials by a Dual-Conductive Polymer Coating", ACS Applied Materials and Interfaces 6 (2014) pp. 2546-2552.
Park, "A novel ion-conductive protection skin based on polyimide gel polymer electrolyte; application to nanoscale coating layer of high voltage $LiNi_{1/3}Co_{1/3}Mn_{1/3}O_2$ cathode materials for lithium-ion batteries", Journal of Materials Chemistry 22 (2012) pp. 12574-12781.
Murugan, "Rapid microwave-solvothermal synthesis of phospho-olivine nanorods and their coating with a mixed conducting polymer for lithium ion batteries", Electrochemistry Communications 10 (2008) pp. 903-906.
Lee, "Li-Anode Protective Layers for Li Rechargeable Batteries via Layer-by-Layer Approaches", Chemistry of Materials, 26 (2014) pp. 2579-2585.

\* cited by examiner

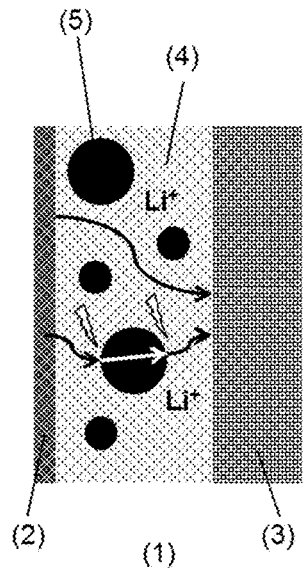
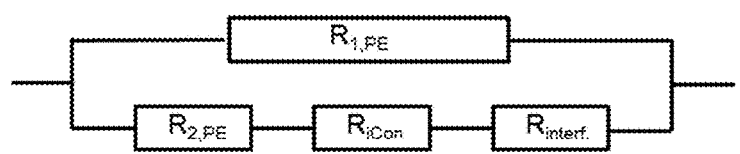
$$\frac{1}{R_{ges}} = \frac{1}{R_{1,PE}} + \frac{1}{R_{2,PE}+R_{iCon}+R_{interf.}}$$
FIG. 1A
FIG. 1B
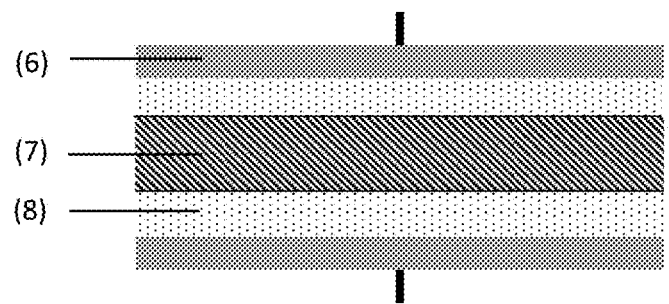
FIG. 2

LITHIUM-ION-CONDUCTING COMPOSITE MATERIAL, COMPRISING AT LEAST ONE POLYMER AND LITHIUM-ION-CONDUCTING PARTICLES

CROSS REFERENCE TO RELATED APPLICATIONS

This application is a continuation of International Application PCT/EP2017/061626 filed May 15, 2017, which claims benefit under 35 USC § 119(a) of German Application No. 102016208532.8 filed May 18, 2016, the entire contents of both of which are incorporated herein by reference.

BACKGROUND

1. Field of the Invention

The invention relates to a lithium-ion-conducting composite material, where the composite material comprises at least one polymer and lithium-ion-conducting particles.

2. Description of Related Art

A key challenge for safe, reliable, and highly performing solutions in the sector of electric mobility is the provision of electrochemical storage assemblies with high energy and power density. Lithium-ion batteries combine a series of outstanding properties, such as high energy and power densities, long life cycles, and good environmental compatibility, making them an energy supply unit in the stated application sector.

Lithium-ion batteries are generally constructed from the following components: cathode, anode, electronically insulating separator, and lithium-ion-conducting electrolyte. During discharge, the lithium ions migrate from anode, through the electrolyte and a separator membrane, to the cathode, where they are intercalated. At the same time, the electrons flow via the external current circuit, in which the consumer is integrated, from the cathode to the anode. During charging, the processes run in the opposite direction.

As well as the rate for the intercalation, into the electrode materials, especially on the cathode side, the migration rate of the lithium ions through the electrolyte has an important part to play, and is a critical determinant of the performance of the overall battery system. This is especially true of lithium batteries (lithium-metal batteries) and solid-state lithium-ion batteries (all solid state batteries, ASSB), in which, rather than—as usual in the case of common lithium-ion battery systems—a liquid electrolyte having a naturally comparatively high lithium-ion conductivity being employed, a solid-state body electrolyte is used in order to increase the safety necessary in a system of high energy density. This electrolyte may be a polymer electrolyte, consisting of a polymer and a lithium-ion-conducting compound (e.g., what is called a conductive salt) which generates the lithium-ion conductivity.

According to Croce, F. et al., Nature 1998, 456; Li, Q. et al., Solid State Ionics 159 (2003) 97-109 and Stephan, A. M. et al., Polymer 47 (2006) 5952-59646, the lithium-ion conductivity of polymer electrolytes can be increased significantly through integration of inorganic, especially ceramic, fillers (lithium-ion-conducting composite material). For this purpose, the filler need not necessarily be lithium-ion-conducting. The reason is that the formation of crystalline regions in the nonconducting thermoplastic polymer is suppressed to a not inconsiderable extent, thereby significantly increasing the mobility of the ions from the conductive salt to be doped.

A further boost to the lithium-ion conductivity of the composite material can be brought about if, rather than a non-lithium-ion-conducting filler, a solid-state lithium-ion conductor (solid ion conductor, SIC) is integrated as filler into the polymer electrolyte. The basis for this is that suitable materials again have an increased lithium-ion grain conductivity relative to the surrounding polymer electrolyte matrix.

Choi, J.-H. et al., Journal of Power Sources 274 (2015) 458-463 describe, in contrast, a lithium-ion-conducting composite material wherein lithium lanthanum zirconate (LLZO) as ceramic solid-state ion conductor is incorporated as filler into a polymer electrolyte. In this case an optimum is achieved for the lithium-ion conductivity if the filler content is 52.5%. In that case the conductivity value was determined, on measurement at a temperature of 55° C., to be $4.42 \times 10^{-4}$ S/cm. The publication gives no indication that the particles of the ceramic solid-state ion conductor, before being incorporated into the polymer, were subjected on their surface to a specific treatment intended to facilitate the passage of the $Li^+$ charge carriers through the interface between polymer and ceramic material.

Where, for the matrix, customary values in the order of magnitude range from $10^{-6}$ to $10^{-5}$ mS/cm are achieved, these values, both for ion conductors having garnetlike crystal phases such as lithium lanthanum zirconium oxide (LLZO) and for phosphate-based ion conductors having a crystal phase isostructural to NaSICon (lithium super ionic conductor, LISICON), especially $Li_{1+x-y}M^{5+}{}_yM^{3+}{}_x M^{4+}{}_{2-x-y}(PO_4)_3$ (M: cation of valence +3, +4 or +5), as lithium-ion-conducting material range within the order of magnitude range from 10–4 to $10^{-3}$ mS/cm.

The following methods have been described for producing inorganic, lithium-ion-conducting materials:

Saluda, A. et al., Journal of The Electrochemical Society 156 (2009) A27-A32 describe the coating of sulfidic solid-state ion conductors in the $Li_2S$—$P_2S_5$ system with a shell of $Li_2O$—$SiO_2$ for reducing the interfacial resistance between solid-state electrolytes and $LiCoO_2$ as active cathode material, which are brought into direct contact with one another in the cell design adopted.

Shimonishi, Y. et al., Solid State Ionics 183 (2011) 48-53 describe the treatment of sintered compacts of LLZO in saturated lithium chloride solution at 50° C. for 7 days, allowing a slight increase in the grain boundary conductivity of the material, while the conductivity in the bulk material remains substantially unchanged. This was ascertained by implementation of impedance spectroscopy. When corresponding samples are similarly treated in 1M aqueous LiOH solution, distilled water or 0.1M hydrochloric acid as modifying agents, in contrast, the grain boundary conductivity goes down.

When electrode active materials come into contact with liquid electrolytes, the first charging procedure is accompanied, as a consequence of secondary reactions which are difficult to control, by the formation of a lithium-ion-conductive solid boundary layer, known as a solid electrolyte interface (SEI), on the surface of the particles of the active material. In the cycling of the battery system, this interface is vital for sufficient speed in relation to the transport of the $Li^+$ charge carriers into the active material and back out of it. Since this reaction, as already mentioned, is comparatively difficult to control, there have in the past been approaches, through deliberate modification to the surface of the electrode-material particles, to ensure charge transfer with greater reproducibility and/or indeed to bring about an acceleration for this purpose.

As well as inorganic coatings, the literature also reports on the use of polymer electrolytes with high electronic conductivity and lithium-ion conductivity for the functionalization. Important representatives identified in this context are poly(3,4-ethylenedioxythiophene) polystyrenesulfonate (PEDOT:PSS) polymer (Yang, Y. et al., Nano 5 (2011) 9187) and/or poly(3,4-ethylenedioxythiophene-co-(poly(ethylene glycol) (PEDOT-co-PEG) block copolymer (Ju, S. H. et al., ACS Appl. Mater. Interfaces 6 (2014) 2545), polyimide (Park, J. H. et al., J. Mater. Chem. 22 (2012) 12574), PEDOT doped with p-toluenesulfonic acid (Murugan, A. V. et al., Electrochem. Commun. 10 (2008) 903), and polyethylene oxide (PEO) (Lee, S. H. et al., Chem. Mater. 26 (2014) 2579).

Known from DE 10 2014 206 040 A1 is a composite electrolyte which comprises inorganic-organic hybrid material with conductive salt and functionalized particles.

WO 2015/043917 A1 discloses a lithium-ion-conducting composite material comprising at least one polymer and lithium-ion-conducting particles, where the polymer is lithium-ion-conducting and consequently the interfacial resistance between the polymer and the particles is reduced.

DE 10 2012 022 606 A1 describes a coated electrode which comprises two coatings: a) a nanostructured coating which comprises particles (crystalline inorganic material), and b) a nanostructured hybrid polymer coating. The particles in the coating a) are preferably electrically semiconducting or conducting. The coating b) may comprise a polymer and a lithium salt and may preferably have a lithium-ion conductivity in the range from $10^{-7}$ to 1 S/cm.

SUMMARY

On this basis, an object of the invention is to provide a lithium-ion-conducting composite material whose lithium-ion conductivity is an improvement over the prior art. The composite material is to be suitable more particularly as a lithium-ion conductor in lithium-ion batteries and in lithium batteries.

This object is achieved by means of a lithium-ion-conducting composite material, comprising at least one polymer and lithium-ion-conducting particles, wherein the interfacial resistance for the lithium-ion conductivity between the polymer and the particles is reduced as a result of a surface modification of the particles and therefore the lithium-ion conductivity is greater than for a comparable composite material wherein the interfacial resistance between the polymer and the particles is not reduced.

Substantially, therefore, the polymer surrounds the particles, or the particles are embedded in the polymer.

The composite material of the invention has improved conductivity for lithium ions and is therefore suitable more particularly as a lithium-ion conductor in lithium-ion and/or lithium batteries.

A lithium-ion-conducting composite material is provided that can have the following features:
1) the lithium-ion-conductive material comprises at least one polymer and lithium-ion-conducting particles;
2) the interfacial resistance for the lithium-ion conductivity between the polymer and the particles is reduced by virtue of a surface modification of the particles and therefore
3) the lithium-ion conductivity is greater than for a comparable composite material wherein the interfacial resistance between the polymer and the particles is not reduced.

It is possible to compare two composite materials (composite material A with comparable composite material B). Here, composite material A has features 1) and 2), namely polymer A, particles A, interfacial resistance G between polymer A and particles A reduced by surface modification of the particles A. Composite material B has feature 3), namely the same polymer A, same particles A, interfacial resistance G between polymer A and particles A not reduced. In order to measure the lithium-ion conductivity of composite material A and comparable composite material B (same measuring conditions, same measuring temperature—implicit preconditions for the skilled person). The two measurement results are compared and, if the lithium-ion conductivity of composite material A is greater than that of comparable composite material B, composite material A falls within the scope of protection.

A particular factor, therefore, is the reduced interfacial resistance owing to surface modification of the particles A of composite material A in comparison to the comparable composite material B.

How the interfacial resistance between polymer and particle is reduced by surface modification of the particles, and therefore how the lithium-ion conductivity is increased, is a subject of the present application, and is set out in detail below in the description.

This object is achieved in some embodiments by a lithium-ion-conducting composite material, comprising at least one polymer and lithium-ion-conducting particles, wherein the interfacial resistance for the lithium-ion conductivity between the polymer and the particles is reduced and therefore the lithium-ion conductivity is at least 5%, more preferably at least 10%, more preferably still at least 15% greater than for a comparable composite material wherein the interfacial resistance between the polymer and the particles is not reduced, more particularly not reduced by virtue of a surface modification of the particles.

In order to be able to compare the lithium-ion conductivity of a composite body of the invention and of a comparable composite body, the same measurement method and the same measuring parameters are chosen for both composite bodies—impedance spectroscopy, for example.

The polymer comprises preferably polyethylene oxide (PEO) or consists of polyethylene oxide or comprises derivatives of polyethylene oxide or consists of these derivatives. Polyethylene oxide is preferred because lithium compounds are readily soluble in polyethylene oxide and the lithium ions are well solvated.

The composite material may comprise one or more polymers.

Preference is given to using crosslinked or noncrosslinked polymers. In preferred embodiments, the polymer is selected from the group encompassing polyethylene oxide (PEO), polyacrylonitrile, polyesters, polypropylene oxide, ethylene oxide/propylene oxide copolymer, polyethylene oxide crosslinked with trifunctional urethane, poly(bis(methoxyethoxy-ethoxide))-phosphazene (MEEP), triol-like polyethylene oxide crosslinked with difunctional urethane, poly ((oligo)oxethylene) methacrylate-co-alkali metal methacrylate, polymethyl methacrylate (PMMA), polymethylacrylonitrile (PMAN), polysiloxanes, and also their copolymers and derivatives, polyvinylidene fluoride or polyvinylidene chloride and also their copolymers and derivatives, poly(chlorotrifluoroethylene), poly(ethylene-chlorotrifluoroethylene), poly(fluorinated ethylene-propylene), acrylate-based polymers, condensed or crosslinked combinations thereof, and/or their physical mixtures.

The polymer further preferably comprises a lithium-ion-conducting compound, especially lithium bistrifluoromethanesulfonimidate (LiTFSI) as lithium-ion-conducting compound. The polymer may comprise one or more such compounds.

A polymer which comprises at least one lithium-ion-conducting compound is a polymer electrolyte in the sense of this patent application.

Suitable lithium salts are selected, for example, from the group encompassing $LiAsF_6$, $LiClO_4$, $LiSbF_6$, $LiPtCl_6$, $LiAlCl_4$, $LiGaCl_4$, LiSCN, $LiAlO_4$, $LiCF_3CF_2SO_3$, $Li(CF_3)SO_3$(LiTf), $LiC(SO_2CF_3)_3$, phosphate-based lithium salts, preferably $LiPF_6$, $LiPF_3(CF_3)_3$ (LiFAP) and $LiPF_4(C_2O_4)$ (LiTFOB), borate-based lithium salts, preferably $LiBF_4$, $LiB(C_2O_4)_2$ (LiBOB), $LiBF_2(C_2O_4)$ (LiDFOB), $LiB(C_2O_4)(C_3O_4)$ (LiMOB), $Li(C_2F_5BF_3)$ (LiFAB) and $Li_2B_{12}F_{12}$ (LiDFB), and/or lithium salts of sulfonylimides, preferably $LiN(FSO_2(LiFSI)$, $LiN(SO_2CF_3)_2$ (LiTFST) and/or $LiN(SO_2C_2F_5)_2$ (LiBETI).

Preferred lithium salts are those which do not decompose at elevated temperatures, for example, of 100° C. or 120° C. In preferred embodiments, the anion of the lithium salt is selected from the group encompassing $PF_6^-$, $BF_4^-$, $SbF_6^-$, $AsF_6^-$, $C_4F_9SO_3^-$, $ClO_4^-$, $AlO_2^-$, $AlCl_4^-$), $(C_xF_{2x+1}SO_3)^-$ where $0 \leq x < 1$, and/or $(C_xF_{2x+1}SO_2)(C_yF_{2y+1}SO_2)N^-$ where $0 \leq x < 1$ and $0 \leq y < 1$.

With particular preference the lithium salt is selected from the group encompassing $LiClO_4$, $LiBF_4$, lithium bis(oxalate) borate, lithium difluoro(oxalate)borate, $LiSO_3CF_3$, lithium 2-pentafluoroethoxy-1,1,2,2-tetrafluoroethanesulfonate, $LiN(FSO_2)_2$ and/or $LiN(SO_2CF_3)_2$. Lithium perchlorate ($LiClO_4$), lithium tetrafluoroborate ($LiBF_4$), lithium bis(oxalato)borate (LiBOB), lithium difluoro(oxalate)borate (LiDFOB), $LiSO_3CF_3$, (LiTf), lithium 2-pentafluoroethoxy-1,1,2,2-tetrafluoroethanesulfonate ($LiSO_3C_2F_4OC_2F_5$), lithium bis(fluorosulfonyl)imide ($LiN(SO_2)_2$, LiFSI) and lithium bis(trifluoromethane)sulfonimide ($LiN(SO_2CF_3)_2$, LiTFSI) are advantageously also stable at temperatures above 100° C.

Composite materials comprising these lithium salts exhibit particularly good conductivity in conjunction with high mechanical stability.

In addition to the stated polymer electrolyte, it is also possible, alternatively, for a polyelectrolyte to be employed. These are polymers, e.g., polystyrenesulfonate (PSS), which carries $Li^+$ as a counterion, or polymerized ionic liquids based on imidazolium, pyridinium, phosphonium or guanidinium, which carry a discrete number of chemically bonded, ionic groups and for that reason are intrinsically lithium-ion-conductive.

The particles preferably consist of a lithium-ion-conducting compound, more particularly of a material having a garnetlike crystal phase with the empirical formula $Li_{7+x-y}M^{II}_xM^{III}_{3-x}M^{IV}_{2-y}M^V_yO_{12}$ where $M^{II}$ is a divalent cation, $M^{III}$ is a trivalent cation, $M^{IV}$ is a tetravalent cation, $M^V$ is a pentavalent cation, where preferably $0 \leq x < 3$, more preferably $0 \leq x \leq 2$, $0 \leq y < 2$, and very preferably $0 \leq y \leq 1$, or compounds derived therefrom, such as lithium lanthanum zirconate (LLZO), more particularly of compounds doped with Al, Nb or Ta, or of a material having a crystal phase isostructural to NaSICon, with the empirical formula $Li_{1+x-y}M^{5+}_yM^{3+}_xM^{4+}_{2-x-y}(PO_4)_3$, where x and y are in the range from 0 to 1 and $(1+x-y) > 1$ and M is a cation of valence +3, +4 or +5 (LISICON), or compounds derived therefrom.

The composite material may comprise particles of one chemical composition or modifications, or it may comprise particles with different chemical compositions or modifications.

LISICON in the context of this invention is also understood as a lithium compound isostructural to NASICON, with the empirical formula:
(1) $Li_{1+x-y}M^V_yM^{III}_xM^{IV}_{2-x-y}(PO_4)_3$ and/or the lithium compound with garnetlike structure of empirical formula
(2) $Li_{7+x-y}M^{II}_xM^{III}_{3-x}M^{IV}_{2-y}M^V_yO_{12}$, which preferably contains no germanium. Germanium is instable with respect to lithium metal. A more suitable tetravalent metal is titanium. Titanium is a readily available raw material, allowing more economic production of the electrolyte and hence of the battery overall.

While the integration of lithium-ion-conducting particles has the stated, positive effects for the ionic conductivity of the bulk materials used, these effects are partly narrowed again or completely eliminated by resistances of the kind which develop at the interface between polymer electrolyte and particles and must be overcome. Accordingly, it is not possible fully to exploit the potential provided by the particles for increasing the overall conductivity of the composite material. Appropriate surface functionalization of the particles allows the stated disadvantage to be (partly) eliminated again, however. The provision of a correspondingly surface-modified material and also methods for producing the same is also a subject of the invention described here.

The particles preferably have an average particle diameter of 0.02 μm to 100 μm. Particularly preferred are diameters in the range from 0.2 μm to 2 μm or in the range from 5 μm to 70 μm. Particularly preferred also are diameters from the two ranges, from 0.2 μm to 2 μm and from 5 μm to 70 μm.

With particular preference, the particles possess an approximate sphere form.

The interfacial resistance between the polymer and the particles is preferably reduced by at least one of the following measures (by virtue of one of the following surface modifications to the particles):
a) covalent attachment of the particles to the polymer,
b) van der Waals attachment of the particles to the polymer,
c) facilitation of lithium-ion transfer between polymer and particles through coating of the particles with at least one other material.

The composite material of the invention is used preferably for the following applications:
  solid electrolyte for lithium-ion or lithium batteries, especially for mobile applications, e.g., electronics articles such as computers, smartphones, wearable electronics (wearables), tools such as power tools, or transport such as vehicles, aircraft, ships, submarines, e-bikes
  solid electrolyte for lithium batteries, especially for fixed applications such as emergency power supply, night supply, power network stabilization, etc.

The lithium-ion conductivity of the composite material was determined as follows. The conductivity measurements were performed by means of a Novocontrol 2-electrode measurement (Novocontrol Technologies) in a frequency range from $10^7$ Hz to $10^{-2}$ Hz. The two electrodes were each made of platinum or nickel (blocking measurement) or of lithium (non-blocking measurement). Electrodes with a diameter of 13 mm were used and with a thickness of 0.1 mm used. The measurements were conducted by pressing the composite material between the respectively selected electrodes at 60° C. The temperature span of the measurement extended from 0° C. (usually room temperature) to 70° C., with measurement at intervals of 5 K or 10 K. When the respective temperature was reached, the sample was equilibrated for 60 minutes, before the conductivity was measured in the frequency range from $10^7$ Hz to $10^{-2}$ Hz.

DESCRIPTION OF THE DRAWINGS

FIG. 1A shows a schematic construction of a composite material;

FIG. 1B shows a schematic depiction of the overall resistance ($R_{ges}$) for the composite material of FIG. 1A;

FIG. 2 illustrates a layer construction for the composite material of FIG. 1A.

DETAILED DESCRIPTION

Figure 3:
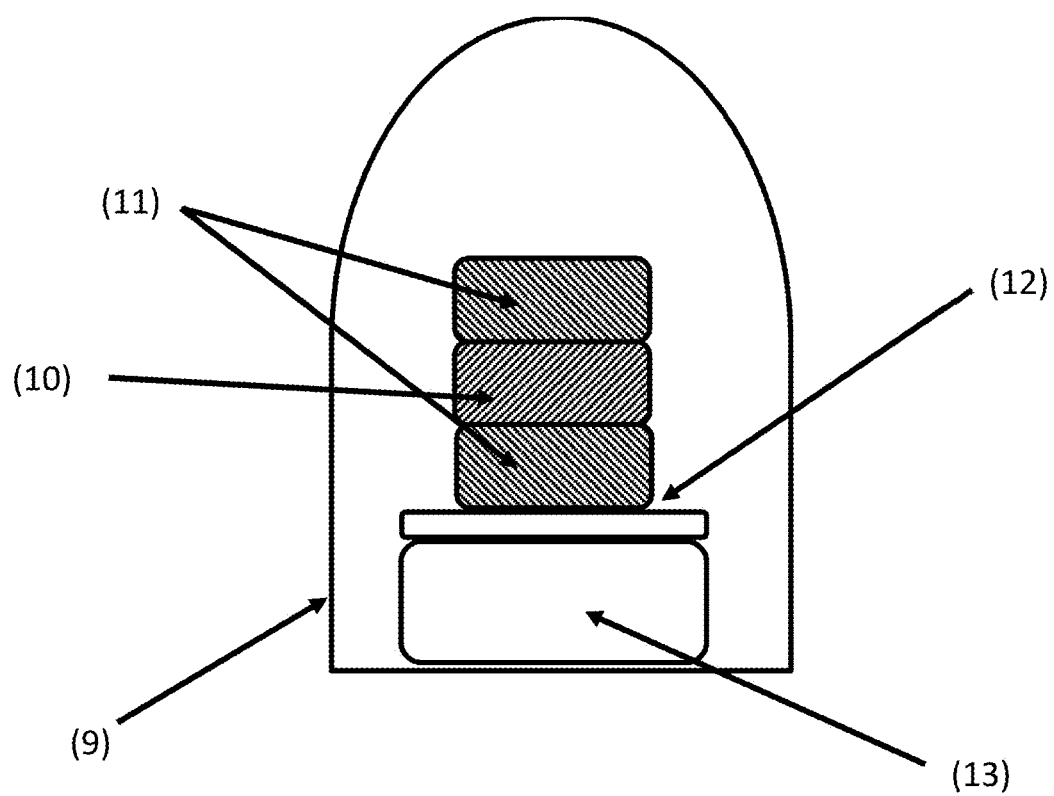
FIG. 3 illustrates a method of producing the composite material of FIG. 1A.

FIG. 1A shows a schematic construction of a composite material (1) of the invention, disposed between a lithium anode (2) and a cathode (3). The composite material (1), comprising at least one polymer (4) and lithium-ion-conducting particles (5), where the interfacial resistance for the lithium-ion conductivity between the polymer (4) and the lithium-ion-conducting particles (5) is reduced and therefore the lithium-ion conductivity is greater than for a comparable composite material wherein the interfacial resistance between the polymer and the lithium-ion-conducting particles is not reduced.

Depicted on the right-side of FIG. 1B is the overall resistance ($R_{ges}$) for the lithium-ion conductivity of the composite material. The reciprocal of the overall resistance is composed of the sum of the reciprocals of the partial resistances, where $R_{1,PE}$ is the resistance of the polymer and ($R_{2,PE}+R_{iCon}+R_{interf.}$) is the resistance of polymer and particles and ionic conductivity at the interface between polymer and particles. If the interfacial resistance for the lithium-ion conductivity between the polymer (4) and the particles (5) is reduced and therefore the lithium-ion conductivity is greater than for a comparable composite material wherein the interfacial resistance between the polymer and the particles is not reduced, this is the preferred path for the lithium ions. On both conduction paths, 1 and 2, there is a resistance contribution of the polymer electrolyte $R_{1,PE}$ and $R_{2,PE}$, respectively. On the path 2, this resistance contribution ought to be significantly lower, owing to the shorter length here along which the lithium ions must travel through the polymer electrolyte (although the length resistance itself is the same). Path 2 is preferred overall when the sum of the resistance contributions to be overcome on migration of the lithium ions through the polymer electrolyte, through the ceramic solid-state ion conductor, and through the interface between polymer electrolyte and ceramic solid-state ion conductor is smaller than the resistance contribution which results on migration of the lithium ions purely through the polymer electrolyte along path 1.

The polymer, or the polymer electrolyte, itself preferably consists of a non-ion-conducting polymer; here it is common to use polyethylene oxide with a suitable chain length, charged with a lithium compound, a conductive lithium salt (e.g., LiTFSI).

Within the composite material of the invention, after integration thereof, for example, into a solid-state lithium-ion battery, lithium-ion transport may take place in principle by way of three routes, which are connected in parallel to one another:

1. exclusively via the polymer or the polymer electrolyte matrix itself;
2. in combination, both via short distance sections through the polymer or the polymer electrolyte matrix, and through the particles;
3. in combination, both via short distance sections through the polymer or the polymer electrolyte matrix, and along the interface between the particles and the polymer or the polymer electrolyte matrix.

Because the inorganic materials that are used in the context of this invention generally have a lithium-ion conductivity which is greater by 2 to 3 orders of magnitude than that of the polymer or the polymer electrolyte, it is likely that route 2 will be taken preferentially. In contrast, the resistances along route 3 appear all in all to be too high, and so this route will no longer be considered any further below. This, however, is only the case if the interfacial resistance (transitional resistance at the interface between polymer or polymer electrolyte and the particles) is sufficiently low. Ensuring this, by appropriate modification to the surface of the particles, is also an object of the invention described here.

Lithium-ion-conducting composite materials of the invention, comprising at least one polymer and lithium-ion-conducting particles, where the interfacial resistance for the lithium-ion conductivity between the polymer and the particles is reduced, were produced for example as follows.

In all of the examples, the lithium-ion conductivity is greater than for a comparable composite material in which the interfacial resistance between the polymer and the particles is not reduced.

There are various ways in which the surface of the particles can be modified, so that the interfacial resistance, which develops with regard to the lithium-ion conduction, between the particles and their surrounding polymer electrolyte matrix adopts a minimum value.

The interfacial resistance between the polymer and ion-conducting material was reduced by at least one of the following measures:

a) covalent attachment of the particles to the polymer,
b) van der Waals attachment of the particles to the polymer,
c) facilitation of lithium-ion transfer between polymer and particles through coating of the particles with at least one other material.

Covalent attachment of the particles to the polymer. For this purpose, the particles are modified on their surface in a first step, for example, by chemical reaction with a silane with a suitable side chain. In a second step, likewise, again, by implementation of a suitable chemical reaction, the polymer is coupled to the side chain.

Example: In the case of polyethylene oxide (PEO), which is typically used as a polymer in polymer electrolytes, the silanization with 3-glycidyloxypropyltriethoxysilane (GLYEO) is appropriate for modifying the surface of the particles, with a covalent bond being formed by the modifying agent to the particles. After the particles have been embedded into the polymer electrolyte matrix, the OH groups present at the chain ends of the PEO are subsequently reacted by thermal means with the epoxy groups present in the side chain of the silane. Overall, therefore, a covalent bridge is formed between the particles and the polymer electrolyte, and significantly facilitates the transfer of lithium ions from the particles into the polymer electrolyte. In this way, a significantly reduced transition resistance is formed at the interface in question, by comparison with the scenario in which particles without any surface modification are used.

Van der Waals attachment of the particles to the polymer. For this purpose, the particles are modified on their surface with a suitable agent by chemical reaction or simply just by accumulation on the basis of dipolar or van der Waals interactions. The agent in this case must have sufficient chemical compatibility with the polymer of the polymer electrolyte, so that, after incorporation of the particles into the polymer electrolyte, a chemical bond is formed by the polymer to the surface of the particles, on the basis of van der Waals and/or dipolar interactions.

Example: In the case of polyethylene oxide (PEO), which is typically used as a polymer in polymer electrolytes, the surface of the particles is approximately modified by silanization with a silane which carries a side chain composed of polyethylene glycol (PEG) units. In this case a covalent bond is formed by the modifying agent to the particles. Alternatively, grinding may also take place in a short-chain liquid polyethylene glycol (e.g., PEG 400 or PEG 200). In that case a covalent bond is formed between the PEG molecules and the particles, as a result of an esterification reaction which occurs in the course of grinding between the OH end groups from the PEG molecules and the chemisorbed water on the surface of the particles. In a third variant, PEG molecules of suitable chain length are accumulated onto the particle surface via dipolar and van der Waals interactions, as for example by contacting the particles by stirring with a solution of PEG in a suitable solvent (e.g., water, alcohol, etc). After the particles have been embedded into the polymer electrolyte matrix, the PEG chains or parts thereof present on the surface of the modified particles subsequently enter into intimate contact with the chains of the PEO, forming interloops, dipolar interactions and van der Waals interactions. Overall, therefore, on the basis of the stated interactions, a chemical bridge is formed between the particles and the polymer electrolyte, and significantly facilitates the transfer of lithium ions from the particles into the polymer electrolyte. In this way, a significantly reduced transition resistance is formed at the interface in question, by comparison with the scenario in which particles without any surface modification are used.

Facilitation of the transfer of lithium ions between polymer and particles through coating of the particles with at least one other material. In this case the other material, which is applied as a shell to the particles in the function of cores, can be distinguished in relation to two different functionalities.

One of the two different functionalities, there are other materials having a certain lithium-ion conductivity:

There is a range of further lithium-ion-conductive materials (e.g., $Li_2TiO_3$, $Li_2ZrO_3$, $Li_2SiO_3$, $Li_3PO_4$, $Li_3VO_4$, etc.) which likewise exhibit a certain lithium-ion conductivity, albeit one which is limited relative to the preferred particles. These materials, however, may notably have a much better chemical compatibility toward the polymer from the polymer electrolyte and may therefore lead to facilitated passage of the $Li^+$ charge carriers through the interface. The interposition of a layer of moderate lithium-ion conductivity may also facilitate the transfer of charge from the particle, which on the one hand has very good lithium-ion conductivity, to the polymer electrolyte, which on the other hand has much poorer conductivity. Through the introduction of an intermediate layer comprising another material of moderate lithium-ion conductivity, a ramp is thus produced in the potential gradient between particles and polymer electrolyte and, so to speak, an "$Li^+$ ion chute" is generated in relation to the electrochemical potential to which the $Li^+$ charge carriers are subject. The precise mechanism of this solution, however, is not yet entirely clear.

The other of the two different functionalities, other materials which per se have no lithium-ion conductivity:

In general, these are lithium-free other materials which do not attach covalently or via pronounced van der Waals interactions to the polymer and at the same time on their own have no lithium-ion conductivity. These may be, for example, the following lithium-free materials:

silanes whose side chains possess a relatively minor but still sufficient chemical compatibility with the polymer and so do not exhibit pronounced coupling to the polymer;

polymers which have a relatively minor yet still sufficient chemical compatibility with the matrix polymer and consequently do not exhibit pronounced coupling to it;

polymers with a highly branched structure;

ceramic materials such as, for example, $BaTiO_3$, $Al_2O_3$, $SiO_2$ etc.

There are various ways in which the stated materials may facilitate the transfer of the $Li^+$ charge carriers from the composite body into the polymer electrolyte:

For example, the lithium-free other material applied may serve as a barrier to unwanted chemical reactions which in the case of direct contact take place uncontrollably quickly or else over a prolonged period of time and lead to an increase in the resistance for the transfer of $Li^+$ charge carriers.

It is also conceivable for the lithium-free other material applied to the particles to reduce or avoid entirely the development of electrochemical barrier phenomena. A barrier phenomenon of this kind may be, for example, the crystallization of the polymer in the region close to the interface, significantly lowering the rate of lithium ion transport in these zones.

Another known phenomenon is that wherein charge clouds are formed at interfaces between materials of different conductivity, as is also the case of the interface between composite material and polymer electrolyte; such charge clouds significantly hinder the transfer of the charge carriers responsible for conduction—in the present case, the lithium ions—from the one material to the other. By application of a lithium-free other material to the particles, a distance between the two types of material can be generated after the particles have been introduced into the polymer electrolyte matrix, and this distance reduces or even entirely suppresses the development of the aforementioned charge clouds. By this means, the polarization which prevails between the ion-conducting phases is stepped down and the transfer of the $Li^+$ charge carriers is significantly facilitated. Because the shell of the other material in this case does not per se have any lithium-ion conductivity, it should be ensured that this shell is not too thick, since otherwise it acts as too great a resistance to the lithium-ion conductivity.

The particles thus functionalized, incorporated as a filler into a polymer electrolyte or into polyelectrolytes, may be used as an electrolyte in rechargeable lithium-ion batteries, particularly in solid lithium-ion batteries. One possible use in this case is as a separator: introduced between the electrodes, the electrolyte preserves them from unwanted short circuiting and so ensures the functioning of the overall system. For this purpose, the composite material of the invention in question can either be applied as a layer to one or both electrodes or integrated as a self-standing membrane, in the form of a solid-state electrolyte, into the battery. Another conceivable application involves compounding with the electrode materials: in this case, the composite material brings about the transport of the relevant charge carriers (lithium ions and electrons) to the electrode materials and away from the conducting electrodes, respectively, depending on whether the battery is being discharged or charged.

Working Examples

Silanization with GLYEO: 10.0 g of lithium lanthanum zirconium oxide (LLZO) powder ($d_{50}$=0.4 μm, specific surface area: 2.5 m$^2$/g) are dispersed with ultrasonication in 75 ml of isopropanol. The particle suspension is admixed, with stirring, with 12 ml of 25% aqueous NH$_4$OH solution. Then 0.9 ml of 3-glycidyloxypropyltriethoxysilane is added and the reaction mixture is left with stirring for 24 hours. After the end of the reaction, the solid is isolated by centrifugation, taken up again with isopropanol, washed, and again centrifuged. Lastly the moist residue is dried in a drying cabinet at 65° C. for 5 hours.

Grinding in PEG 400: 70.0 g of lithium lanthanum zirconium oxide (LLZO) powder ($d_{50}$=0.4 μm, specific surface area: 2.5 m$^2$/g) are added with stirring to a mixture of 140 g of polyethylene glycol 400 (PEG 400) and 50 ml of isopropanol. The particle suspension is admixed with 1030 g of ZrO$_2$ grinding beads (d=0.7-0.9 mm) and the batch is treated at 1000 rpm in the Netzsch PE 075S attritor. The particle suspension is subsequently separated from the grinding beads in 3 passes by washing each time with 50 ml of isopropanol through a coarse sieve, and the product is isolated by centrifugation and dried in a drying cabinet at 65° C. for 5 hours.

Coating with a lithium-ion-conducting Li$_2$TiO$_3$ shell: 18.0 g of lithium lanthanum zirconium oxide (LLZO) powder ($d_{50}$32 1.0 μm, specific surface area: 1.0 m$^2$/g) are dispersed with ultrasonication in 633 ml of ethanol. The particle suspension is admixed with 35 ml of 25% aqueous NH$_4$OH solution (solution A). In parallel with this, 3.4 ml of titanium (IV) n-butoxide are admixed with 100 ml of ethanol and 1.0 ml of acetylacetone is cautiously added dropwise to the solution (solution B). In a further preparation, 2.0 g of lithium acetate dehydrate are dissolved with heating in 100 ml of ethanol (solution C). Then, first solution B and solution C are mixed, and this mixture is subsequently added to the particle suspension (solution A) and the resulting reaction mixture is left with stirring for a further 24 hours. After the end of the reaction, the solid is isolated by centrifugation at 3000 rpm for 5 minutes; finally, the moist residue is dried in a drying cabinet at 65° C. for 5 hours and then further calcined at 750° C. (heating rate 10° C./min) for 2 hours.

Coating with a lithium-free BaTiO$_3$ shell: 18.0 g of lithium lanthanum zirconium oxide (LLZO) powder ($d_{50}$=1.0 μm, specific surface area: 1.0 m$^2$/g) are dispersed with ultrasonication in 633 ml of ethanol. The particle suspension is admixed with 35 ml of 25% aqueous NH$_4$OH solution (solution A). In parallel with this, 3.4 ml of titanium n-butoxide are admixed with 100 ml of ethanol and 1.0 ml of acetylacetone is cautiously added dropwise to the solution (solution B). In a further preparation, 3.4 g of barium perchlorate are dissolved in 100 ml of ethanol (solution C). Then, first solution B and solution C are mixed, and this mixture is subsequently added to the particle suspension (solution A) and the resulting reaction mixture is left with stirring for a further 24 hours. After the end of the reaction, the solid is isolated by centrifugation, again taken up with ethanol, washed, and again centrifuged. Finally, the moist residue is dried in a drying cabinet at 65° C. for 5 hours and then further calcined at 500° C. for 4 hours.

Production of a lithium-ion-conductive membrane from the composite material of the invention, the composite material comprising a polymer filled with 15 vol % of particles.

1.73 g of LiTFSI are dissolved in 246 ml of acetonitrile. The solution is subsequently admixed with 5.0 g of polyethylene oxide (PEO) (M=600 000 g/mol) (this step is performed in a glove box) and then stirred (overnight) until the polymer has fully dissolved. Thereafter 2.57 g of surface-modified LLZO powder are dispersed in the solution of the previously prepared polymer electrolyte. 30 ml of the mixture obtainable in this way are poured into a Teflon mold having a base area of 10×10 cm$^2$ and the solvent is evaporated off in a desiccator under a gentle stream of nitrogen. This leaves a membrane of composite material around 120 μm thick, which can be carefully removed from the Teflon mold. To remove final residues of solvent, further drying takes place in a vacuum drying cabinet at 65° C. for 5 hours. The sample is subsequently subjected to measurement by impedance spectroscopy, with regard to the lithium-ion conduction resistances present in the sample, and is compared with a sample which has been produced correspondingly with the same amount of non-surface-modified LLZO powder. The lithium-ion conductivity of the composite body of the invention is significantly higher, and the composite body is therefore especially suitable as a lithium-ion conductor in lithium-ion batteries.

Determination of the Interfacial Resistance Between Polymer (Polymer Electrolyte) and Particle Material by Means of Impedance Spectroscopy In order to determine the pure interfacial resistance between polymer and particle material per se, it is possible to use a specific sample setup in the form of a layer construction. Hence it is possible in principle to draw conclusions about the quality of a composite material of the invention which comprises a corresponding polymer and corresponding particles, and, furthermore, to verify whether a composite material falls within the scope of protection. This layer construction is depicted in FIG. 2 (Au electrode (6), LLZO disk (particle material) (7), polymer (electrolyte) (8)). In this case the material of which the particles consist is present in the form of a circular disk, with a thin ply of the polymer applied to the base of the disk on either side. In order to reduce the interfacial resistance between polymer and particle material, the bases of the particle material are provided with the surface modifications (e.g., functionalizations and/or coatings) before the polymer is applied.

By way of example, for determining the interfacial resistance, in a glove box (MBraun, H$_2$O+O$_2$<0.1 ppm), polymer electrolyte layers (PEO+LiTFSI with Li:O=1:18, Sigma Aldrich, molecular weight PEO=4×105 g/mol) were pressed onto both sides of the disk consisting of the solid-state ion conductor particle material. For better contact, these samples were placed in airtight packaging and pressed in an oven at 60° C. for 1 hour using a 1.2 kg weight.

Within a glove box, the samples were installed into a BDS1308 sample cell from Novocontrol. This cell is connected via a ZG4 impedance interface (Novocontrol) to an alpha-A high performance analyzer mainframe (Novocontrol). The temperature was kept constant (±0.1 K) and monitored by means of a Pt sensor. The WinDETA software carried out AC impedance measurements in the frequency range from 10$^{-1}$ Hz to 2×10$^7$ Hz. The voltage amplitude is 20 mV.

Evaluation was carried out using the ZView software (Scribner Associates, Inc.). First of all, symmetrical Au-LLZO-Au and Au-PEM-Au samples (PEM=polymer electrolyte membrane) were measured, in order to determine the characteristic frequencies and conductivities. This was followed by the actual characterization of the above-described Au-PEM-solid-state ion conductor-PEM-Au reference and Au-PEM-FL-solid-state ion conductor-FL-PEM-Au sandwich systems (FL=functionalization layer). The resulting semicircles in the Nyquist diagram were fitted by means of RQ elements. For the nonideal blocking of the gold electrodes, a constant phase element (CPE) was likewise fitted on. The first semicircle corresponds substantially to the bulk conductivity of the polymer layers (the conductivity of the solid-state ion conductor particle material is in general higher by approximately two orders of magnitude than that of the polymer, and so its contribution is superimposed entirely by the polymer semicircle). The second semicircle therefore represents the desired interfacial contribution. The capacitances can be calculated by means of the Brug formula and classified according to the scheme of Irvine, Sinclair and West.

Where LLZO is used as solid-state ion conductor material, for the Au-PEM-solid-state ion conductor-PEM-Au reference system, in which a discoid roundel of solid-state ion conductor material was taken from a solid LLZO melt block and left as such uncoated, the transition resistance between solid-state ion conductor and polymer electrolyte was determined as being $7\times10^5$ ohm $cm^2$.

The interfacial resistance between polymer and functionalized and/or coated solid-state ion conductor particle material was determined on a discoid body produced by sintering from the corresponding solid-state ion conductor material in powder form. For this purpose, in one particular embodiment, LLZO as solid-state ion conductor particle material was first subjected to uniaxial pressing, to form a compact, and the preform obtainable in this case was compacted by sintering to form the desired dense roundel sample.

By way of example, for the production of the compact, 0.5 g of LLZO powder was pressed by means of a hydraulic manual press at 30 kN for two minutes. The compact (10) subsequently has a diameter of 10 mm and a thickness of 1.9 mm to 2.2 mm. To produce the discoid body, subsequently three compacts ("sacrificial" compact (11), compact for surface modification (10), "sacrificial" compact (11)) were stacked in triplicate one above another on a zirconium oxide fleece (12), as shown in the schematic construction in FIG. 3. The samples were covered with an aluminum oxide crucible (9) and placed centrally in the oven on an $SiO_2$ support (13). The oven was heated up from 25° C. at 10 K/min to 900° C. The temperature of 900° C. was held for an hour and the oven is subsequently heated to 1150° C. at 2 K/min. When the oven had been held at the temperature for an hour, at 1150° C., it was cooled with the oven characteristic line to 700° C. At 700° C., the sample was removed and cooled in a desiccator. The middle sample was subsequently used further for coating.

The bases of this sintered body were subsequently modified or coated on their surface in order to reduce the interfacial resistance. The functionalized roundels of solid-state ion conductor material were then integrated into the layered measurement setup already described above, and the transition resistance at the interface between polymer and functionalized solid-state ion conductor particle material was determined correspondingly in accordance with the measurement procedure above for the unfunctionalized or uncoated reference system.

To produce functionalized or coated discoid roundel samples, consisting of solid-state ion conductor particle material (here LLZO), the procedure adopted was as follows:

Silanization with GLYEO: Place 5 g of 3-glycidyloxypropyltriethoxysilane (GLYEO) in 10 ml of isopropanol. To the mixture, add first 2.17 ml of water and then 0.07 ml of 30% acetic acid. Stir this concentrate for around 2 minutes. Then make it up to 500 ml with ethanol.

The coating solution, sprayed onto both bases of the discoid roundel consisting of LLZO, was dried in air at room temperature. The roundel coated accordingly was subsequently integrated into the layerlike Au-PEM-FL-solid-state ion conductor-FL-PEM-Au (FL=functionalization layer) measurement setup already described above. For the covalent attachment of the terminal OH groups from the PEO chains of the polymer electrolyte to the surface of the GLYEO-functionalized LLZO roundel sample, they were reacted with the epoxide groups present there correspondingly, reaction taking place by temperature treatment at 100° C. for 1 hour. After cooling had taken place to room temperature, the interfacial resistance was determined at the interface between polymer and functionalized solid-state ion conductor particle material in accordance with the measurement procedure described above. The measurement in this case is $6\times10^3$ ohm $cm^2$ and is therefore around two orders of magnitude lower than that of the untreated reference.

Functionalization with PEG 200: Place 5 g of PEG 200 in 500 ml of isopropanol.

The coating solution, sprayed onto both bases of the discoid roundel consisting of LLZO, was dried in air at room temperature. The roundel coated accordingly was subsequently integrated into a sandwichlike Au-PEM-FL-solid-state ion conductor-FL-PEM-Au (FL=functionalization layer) measurement setup as described above. Subsequently, the interfacial resistance was determined at the interface between polymer electrolyte and functionalized solid-state ion conductor material in accordance with the measurement procedure described above. The measurement in this case is $3\times10^3$ ohm $cm^2$ and is therefore more than two orders of magnitude lower than that of the untreated reference.

Coating with $Li_2ZrO_3$ layer: In a 1000 ml round-neck flask, to 63 g (0.15 mol) of a 78% $Zr(OiPr)_4$ solution in isopropanol, add an equimolar amount, i.e., 15.0 g, of acetylacetone by means of a dropping funnel at a dropping rate of around 1 drop per second with continual stirring. After the stirring for around 1 hour at RT, add 8.1 g (0.45 mol) of water to the reaction mixture for hydrolysis. After a stirring time of around 15 minutes, add 30.6 g (0.30 mol) of lithium acetate dehydrate. To give the final coating sol, finally, dilute the concentrate with a mixture of 365 g of ethanol and 19.2 g (0.129 mol) of triethanolamine. Solids content of $Li_2ZrO_3$ (M=183.09 g/mol) in the solution is around 50 g/l or 5 weight %. The coating solution was applied by spraying to both bases of the roundel consisting of LLZO and the roundel after drying was baked at 650° C. for 30 minutes. An $Li_2ZrO_3$ layer with a thickness of around 100 nm was formed. The roundel coated accordingly was subsequently integrated into a sandwichlike Au-PEM-FL-solid-state ion conductor-FL-PEM-Au (FL=functionalization layer) measurement setup as described above, and the interfacial resistance was determined at the interface between polymer and functionalized solid-state ion conductor particle material in accordance with the measurement procedure described above. The measurement in this case is $7 \times 10^4$ ohm $cm^2$ and is therefore around one order of magnitude lower than that of the uncoated reference.

Coating with a $BaTiO_3$ layer: In a 1000 ml round-neck flask, to 42.6 g (0.15 mol) of $Ti(OiPr)_4$, add an equimolar amount, i.e., 15.0 g, of acetylacetone by means of a dropping funnel at a dropping rate of around 1 drop per second with continual stirring. After the stirring for around 1 hour at room temperature, add 8.1 g (0.45 mol) of water to the reaction mixture for hydrolysis. After a stirring time of around 15 minutes, add 50.4 g (0.15 mol) of barium perchlorate. To give the final coating sol, finally, dilute the concentrate with 385 g of ethanol. Solids content of $BaTiO_3$ (M=276.55 g/mol) in the solution is around 75 g/l or 7.5 weight %. The coating solution was applied by spraying to both bases of the round roundel consisting of LLZO and the roundel after drying was baked at 650° C. for 30 minutes. A $BaTiO_3$ layer with a thickness of around 100 nm was formed. The roundel coated accordingly was subsequently integrated into a layered Au-PEM-FL-solid-state ion conductor-FL-PEM-Au (FL=functionalization layer) measurement setup as described above, and the interfacial resistance was determined at the interface between polymer and functionalized solid-state ion conductor particle material in accordance with the measurement procedure described above. The measurement in this case is $2 \times 104$ ohm $cm^2$ and is therefore around one order of magnitude lower than that of the uncoated reference.

What is claimed is:

1. A lithium-ion-conducting composite material, comprising:
   a polymer;
   lithium-ion-conducting particles; and
   a coating on the lithium-ion-conducting particles comprising at least one lithium metal oxide,
   wherein the coating is a surface modification that reduces an interfacial resistance for lithium-ion conductivity between the polymer and the particles so that the lithium-ion conductivity is greater than for a comparable composite material without the surface modification,
   wherein the lithium-ion conductivity between the polymer and the particles is facilitated through the coating, and
   wherein the at least one lithium metal oxide has a formula $Li_xMeO_y$, with $0 \leq x \leq 3$, Me being selected from a metal with a valency of n, P, or B, where n is 3, 4, or 5, and where $y=(x+n)/2$.

2. The composite material of claim 1, wherein the polymer comprises at least one lithium-ion-conducting compound.

3. The composite material of claim 1, wherein the polymer comprises polyethylene oxide and derivatives of polyethylene oxide.

4. The composite material of claim 3, wherein the polymer comprises at least one lithium-ion-conducting compound.

5. The composite material of claim 4, wherein the polymer comprises lithium bistri(fluoromethanesulfon)imide.

6. The composite material of claim 1, wherein the particles consist of a lithium-ion-conducting compound.

7. The composite material of claim 6, wherein the particles consist of a material having a garnetlike crystal phase with the empirical formula: $Li_{7+x-y}M_x{}^{II}M_{3-x}{}^{III}M_{2-y}{}^{IV}M_y{}^{V}O_{12}$ where $M^{II}$ is a divalent cation, $M^{III}$ is a trivalent cation, $M^{IV}$ is a tetravalent cation, $M^V$ is a pentavalent cation, and $0 \leq x \leq 3$ and $0 \leq y < 2$ or a compound derived therefrom.

8. The composite material of claim 6, wherein the particles consist of a material having a crystal phase isostructural to NaSICon, with the empirical formula $Li_{1+x-y}M_x{}^{II}M^{5+}{}_yM^{3+}{}_xM^{4+}{}_{2-x-y}(PO_4)_3$, where x and y are in the range from 0 to 1 and $(1+x-y) > 1$ and M is a cation of valence +3, +4 or +5 or a compound derived therefrom.

9. The composite material of claim 1, wherein the particles have an average particle diameter of 0.02 μm to 100 μm.

10. The composite material of claim 9, wherein the particles have an average particle diameter of 0.2 μm to 2 μm.

11. The composite material of claim 9, wherein the particles have an average particle diameter of 5 μm to 70 μm.

12. A lithium-ion-conducting composite material, comprising:
   a polymer; and
   lithium-ion-conducting particles having a surface modification that reduces an interfacial resistance of lithium-ion conductivity between the polymer and the particles so that the lithium-ion conductivity is at least 5% greater than for a comparable composite material without the surface modification,
   wherein the lithium-ion conductivity of the conducting particles is greater by 2 orders of magnitude than that of the polymer, and
   wherein the surface modification comprises at least one lithium metal oxide having a formula $Li_xMeO_y$ with $0 \leq x \leq 3$, Me being selected from a metal with a valency of n, P, or B, where n is 3, 4, or 5, and where $y=(x+n)/2$, and
   wherein the polymer, the lithium-ion-conducting particles, and the surface modification are configured for use in a solid-state battery.

13. The composite material of claim 12, wherein the polymer comprises a material selected from the group consisting of at least one lithium-ion-conducting compound, polyethylene oxide, derivatives of polyethylene oxide, and lithium bistri(fluoromethanesulfon)imide.

14. The composite material of claim 2, wherein the at least one lithium-ion-conducting compound is selected from a group consisting of $LiAsF_6$, $LiClO_4$, $LiSbF_6$, $LiPtCl_6$, $LiAlCl_4$, $LiGaCl_4$, LiSCN, $LiAlO_4$, $LiCF_3CF_2SO_3$, $Li(CF_3)SO_3$ (LiTf), $LiC(SO_2CF_3)_3$, $LiPF_6$, $LiPF_3(CF_3)_3$ (LiFAP), $LiPF_4(C_2O_4)$ (LiTFOB), $LiBF_4$, $LiB(C_2O_4)_2$ (LiBOB), $LiBF_2(C_2O_4)$ (LiDFOB), $LiB(C_2O_4)(C_3O_4)$ (LiMOB), $Li(C_2F_5BF_3)$ (LiFAB), $Li_2B_{12}F_{12}$ (LiDFB), $LiN(FSO_2)_2$ (LiFSI), $LiN(SO_2CF_3)_2$ (LiTFSI), $LiN(SO_2C_2F_5)_2$ (LiBETI) $LiClO_4$, lithium bis(oxalate)borate, lithium difluoro(oxalate)borate, $LiSO_3CF_3$, lithium 2-pentafluoroethoxy-1,1,2,2-tetrafluoroethanesulfonate, lithium 2-pentafluoroethoxy-1,1,2,2-tetrafluoroethanesulfonate ($LiSO_3C_2F_4OC_2F_5$), and/or mixtures thereof.

15. The composite material of claim 1, wherein the polymer is selected from a group consisting of polyethylene oxide (PEO), polyacrylonitrile, polyesters, polypropylene oxide, ethylene oxide/propylene oxide copolymer, polyethylene oxide crosslinked with trifunctional urethane, poly(bis(methoxy-ethoxy-ethoxide))phosphazene (MEEP), triol-like polyethylene oxide crosslinked with difunctional urethane, poly((oligo)oxethylene) methacrylate-co-alkali metal methacrylate, polymethyl methacrylate (PMMA), polymethylacrylonitrile (PMAN), polysiloxanes, and also their copolymers and derivatives, polyvinylidene fluoride or polyvinylidene chloride and also their copolymers and derivatives, poly(chlorotrifluoroethylene), poly(ethylene-chlorotrifluoroethylene), poly(fluorinated ethylene-propylene), acrylate-based polymers, condensed or crosslinked combinations thereof, and/or mixtures thereof.

16. The composite material of claim 4, wherein the at least one lithium-ion-conducting compound is selected from a group consisting of $LiAsF_6$, $LiClO_4$, $LiSbF_6$, $LiPtCl_6$, $LiAlCl_4$, $LiGaCl_4$, LiSCN, $LiAlO_4$, $LiCF_3CF_2SO_3$, $Li(CF_3)SO_3$ (LiTf), $LiC(SO_2CF_3)_3$, $LiPF_6$, $LiPF_3(CF_3)_3$ (LiFAP), $LiPF_4(C_2O_4)$ (LiTFOB), $LiBF_4$, $LiB(C_2O_4)_2$ (LiBOB), $LiBF_2(C_2O_4)$ (LiDFOB), $LiB(C_2O_4)(C_3O_4)$ (LiMOB), $Li(C_2F_5BF_3)$ (LiFAB), $Li_2B_{12}F_{12}$ (LiDFB), $LiN(FSO_2)_2$ (LiFSI), $LiN(SO_2CF_3)_2$ (LiTFSI), $LiN(SO_2C_2F_5)_2$ (LiBETI) $LiClO_4$, lithium bis(oxalate)borate, lithium difluoro(oxalate)borate, $LiSO_3CF_3$, lithium 2-pentafluoroethoxy-1,1,2,2-tetrafluoroethanesulfonate, lithium 2-pentafluoroethoxy-1,1,2,2-tetrafluoroethanesulfonate ($LiSO_3C_2F_4OC_2F_5$), and/or mixtures thereof.

17. The composite material of claim 1, wherein the surface modification is a layer with a thickness of around 100 nm.

18. The composite material of claim 1, wherein the polymer is filled with at least 15 vol % of the particles.

19. The composite material of claim 1, wherein n is 4 or 5.

20. The composite material of claim 1, wherein the at least one lithium metal oxide is selected from a group consisting of $Li_2TiO_3$, $Li_2ZrO_3$, $Li_2SiO_3$, $Li_3PO_4$, $Li_3VO$, and any combinations thereof.

21. The composite material of claim 1, wherein the polymer, the lithium-ion-conducting particles, and the coating are configured for use in a solid-state battery.

22. The composite material of claim 12, wherein n is 4 or 5.

23. The composite material of claim 12, wherein the at least one lithium metal oxide is selected from a group consisting of $Li_2TiO_3$, $Li_2ZrO_3$, $Li_2SiO_3$, $Li_3PO_4$, $Li_3VO$, and any combinations thereof.

24. The composite material of claim 12, wherein the polymer, the lithium-ion-conducting particles, and the surface modification are configured for use in a solid-state battery.

* * * * *